United States Patent [19]

Hawkins et al.

[11] Patent Number: 5,333,116

[45] Date of Patent: Jul. 26, 1994

[54] COMBINATION LAPTOP AND PAD COMPUTER

[75] Inventors: Jeff C. Hawkins, Redwood City; John J. Daly, San Carlos, both of Calif.

[73] Assignee: AST Research, Inc., Irvine, Calif.

[21] Appl. No.: 25,900

[22] Filed: Mar. 3, 1993

Related U.S. Application Data

[63] Continuation of Ser. No. 932,515, Aug. 20, 1992, abandoned, which is a continuation of Ser. No. 839,004, Feb. 14, 1992, Pat. No. 5,200,913, which is a continuation of Ser. No. 519,031, May 4, 1990, abandoned.

[51] Int. Cl.$^5$ ................................................ G06F 1/00
[52] U.S. Cl. ..................................... 364/708.1; 345/169
[58] Field of Search ...................... 364/708; 340/707; D14/106; D18/6, 7

[56] References Cited

U.S. PATENT DOCUMENTS

| 4,238,791 | 12/1980 | Cohen et al. | 340/707 |
| 4,517,660 | 5/1985 | Fushimoto et al. | 364/708 |
| 4,718,740 | 12/1988 | Cox | 312/208 |
| 4,742,478 | 5/1988 | Nigro, Jr. et al. | 364/708 |
| 4,785,564 | 11/1988 | Gortler | 340/707 |
| 4,830,328 | 5/1989 | Takach, Jr. | 364/708 |
| 4,839,837 | 6/1989 | Chang | 364/708 |
| 4,851,812 | 7/1989 | Holmberg | 364/708 |
| 4,864,523 | 9/1989 | Sasaki | 364/708 |
| 4,949,079 | 8/1990 | Loebner | 340/707 |
| 4,978,949 | 12/1990 | Herron et al. | 364/708 |

FOREIGN PATENT DOCUMENTS

| 0749762 | 7/1985 | European Pat. Off. |
| 63-39731 | 3/1988 | Japan |
| 1131913 | 5/1989 | Japan |
| 341326 | 4/1991 | Japan |

OTHER PUBLICATIONS

Mabie et al *Mechanisms and Dynamics of Machinery* John Wiley & Sons, Inc. 1963 pp. 15-16.

*Primary Examiner*—David H. Malzahn
*Attorney, Agent, or Firm*—Townsend and Townsend Khourie and Crew

[57] ABSTRACT

A portable lightweight combination laptop and pad computer has a display mounted on a main housing for movement between a closed position and an open position. In the closed position, a keyboard is covered by the undersurface of the display and the display viewing surface remains visible so that the computer may be used in the pad mode with a conductive stylus for data and command entry. In the open position, the keyboard is exposed so that the computer may be used in a laptop or desk top mode, or in a combined mode including the pad mode. The display is mounted to the housing by a four bar hinge mechanism, and a pair of latches are provided approximately mid-way between the front and rear portions of the housing along the side margins to securely latch the display in the closed position for storage, transit or use in the pad mode.

A removable power pack, which attaches to the rear of the housing, carries battery power and a charging circuit for supplying power to the computer elements contained within the housing.

7 Claims, 4 Drawing Sheets

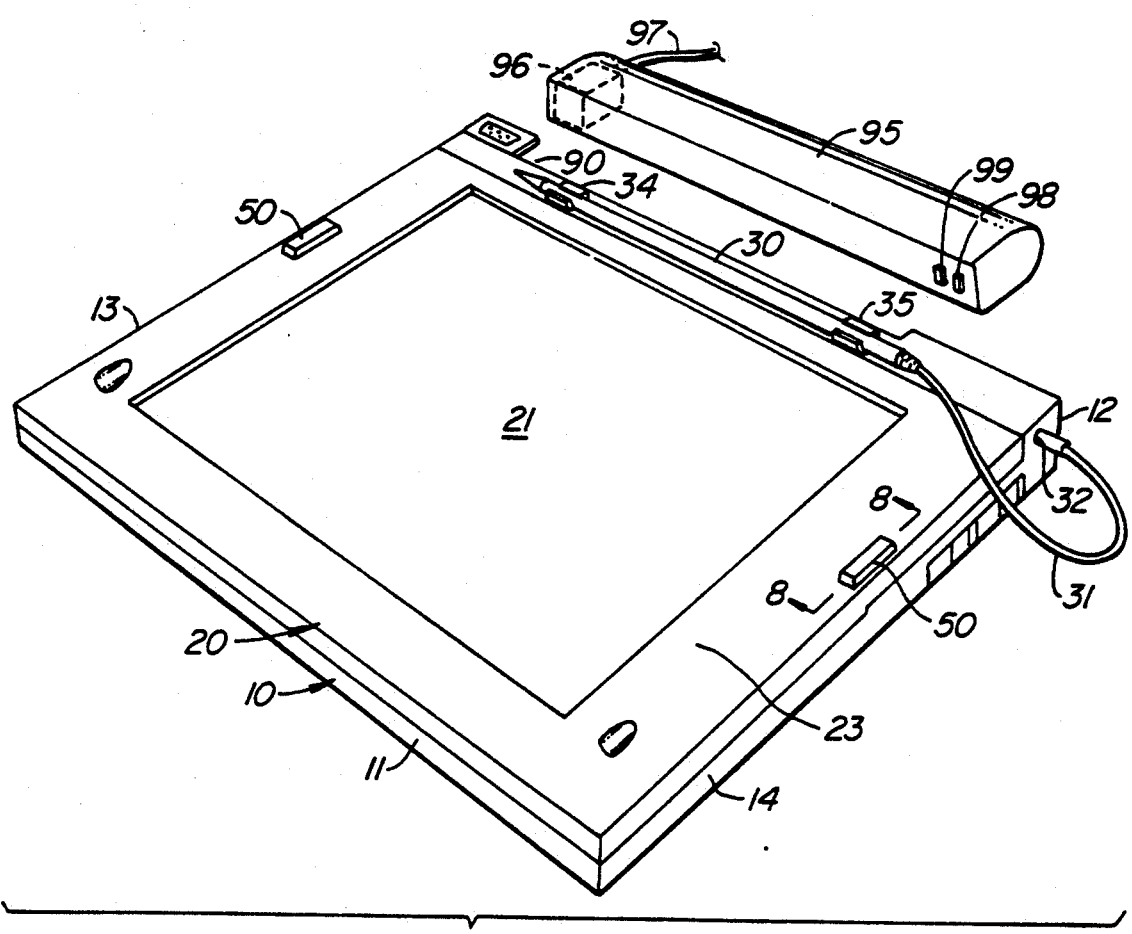
FIG._1.
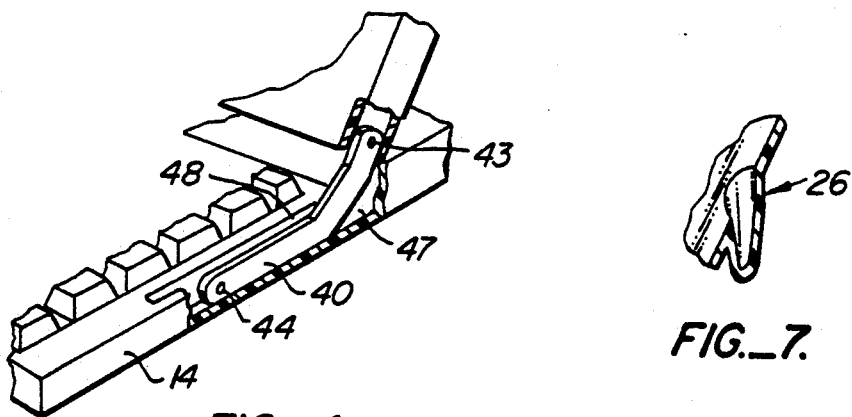
FIG._4.
FIG._7.
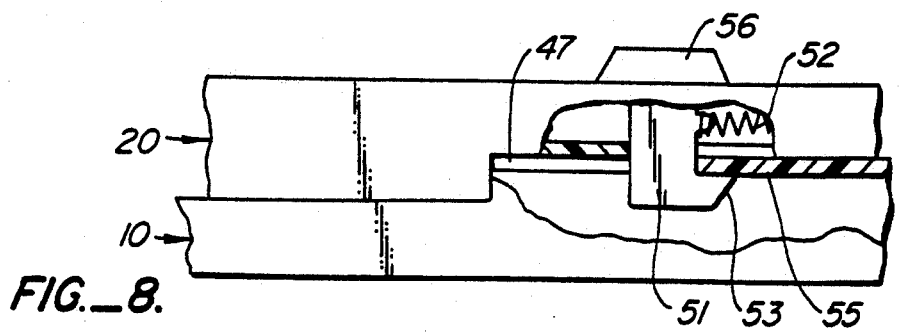
FIG._8.

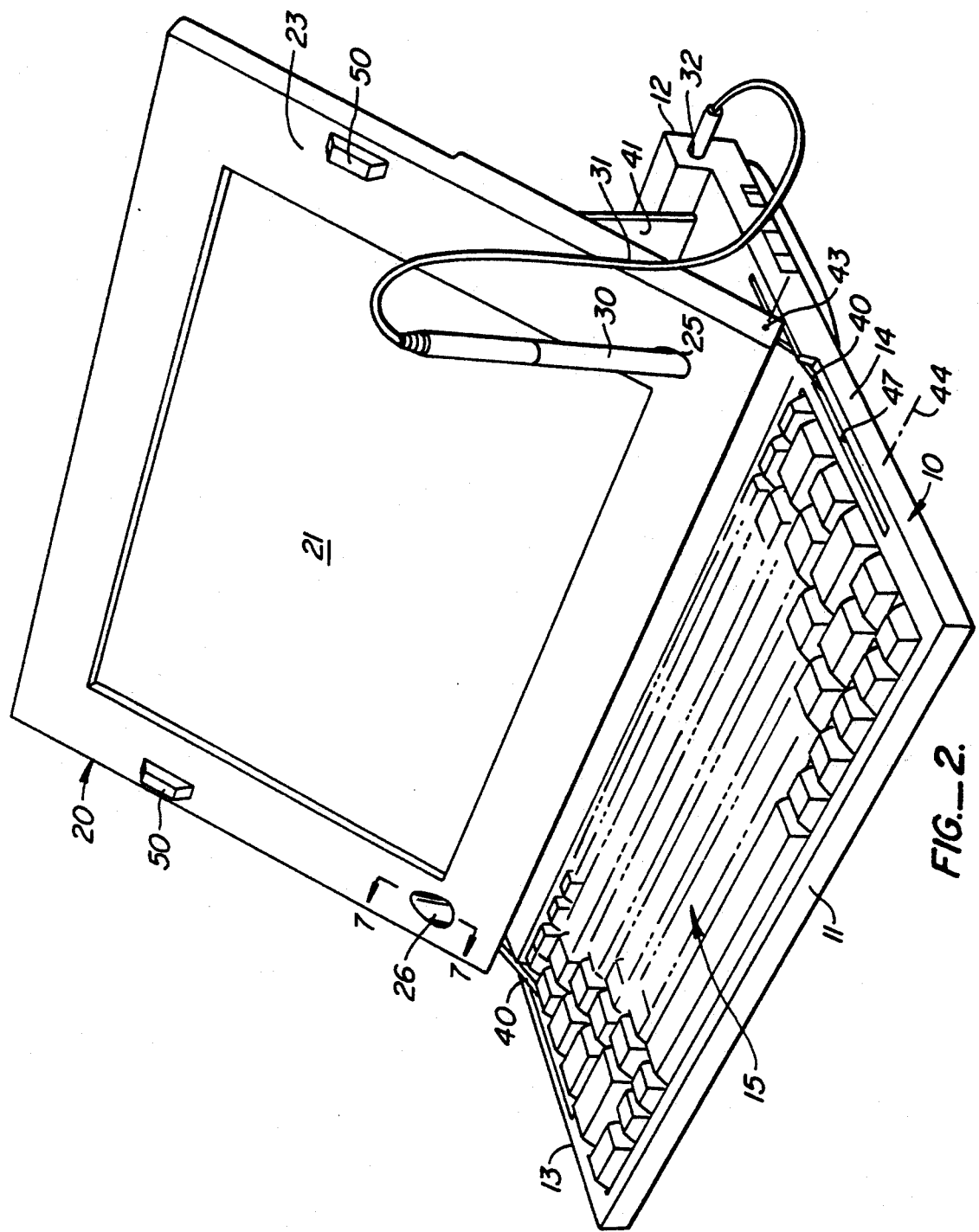
FIG._2.

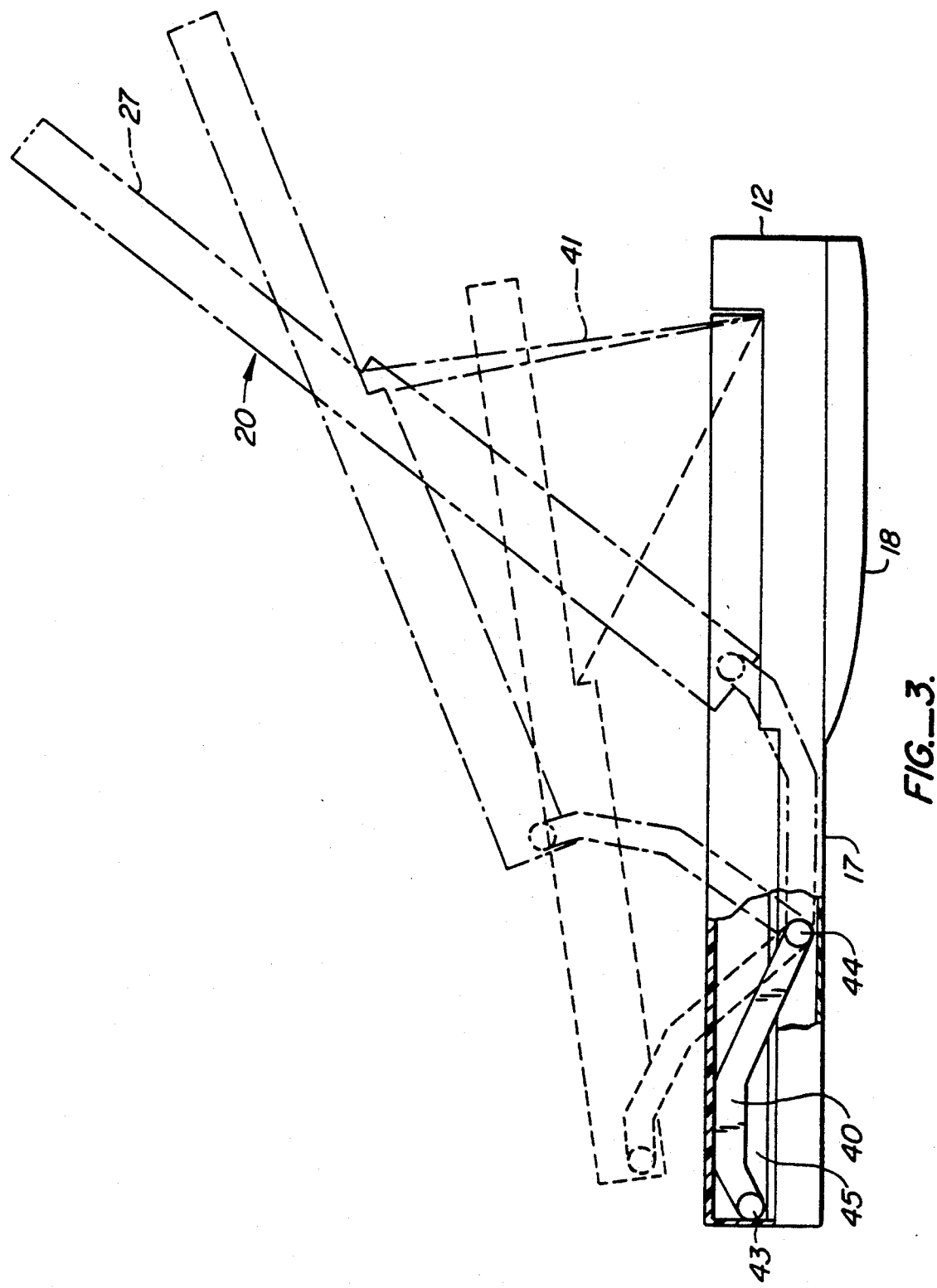

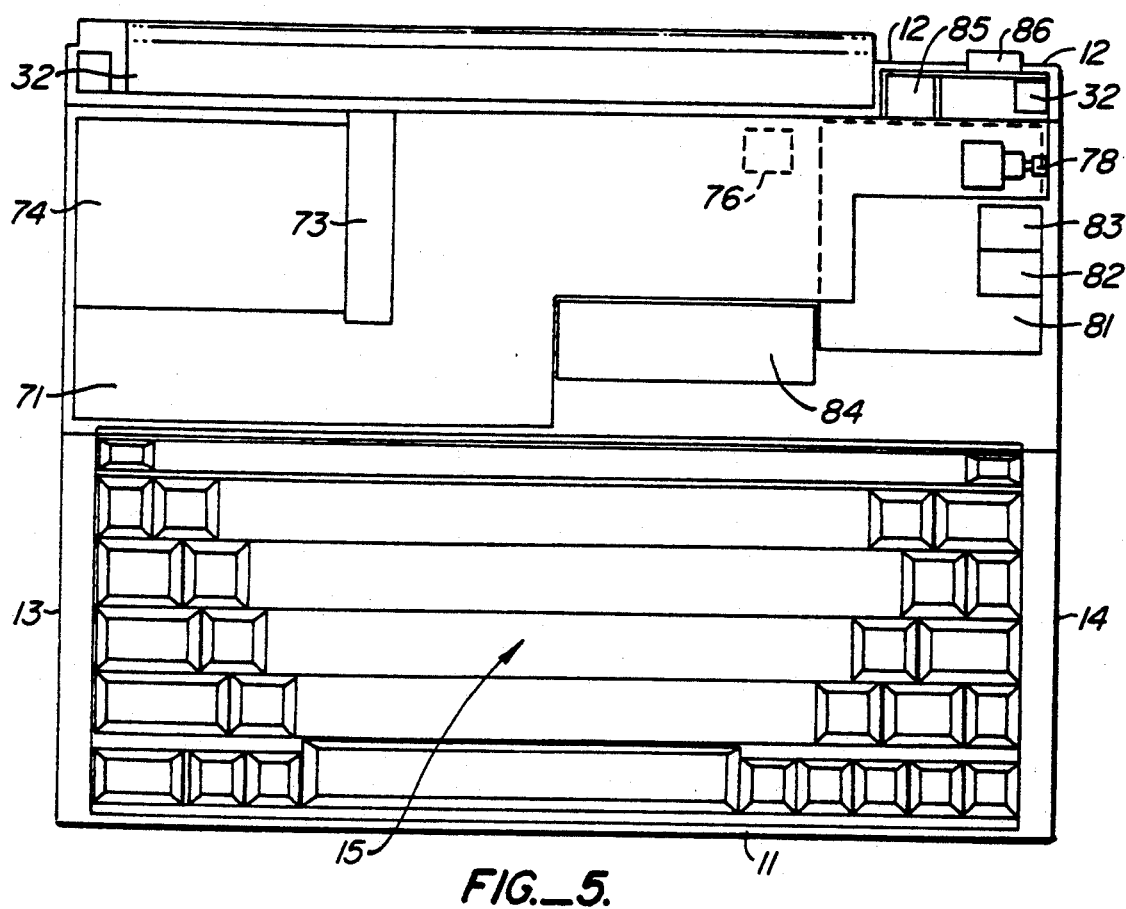
FIG._5.
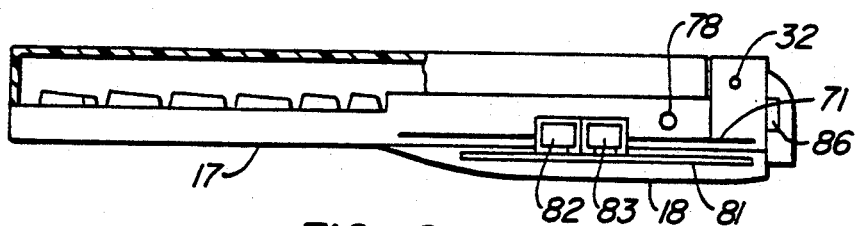
FIG._6.

COMBINATION LAPTOP AND PAD COMPUTER

This is a continuation of U.S. patent application Ser. No. 07/932,515, now abandoned, filed Aug. 20, 1992, which is a continuation of U.S. patent application Ser. No. 07/839,004, filed Feb. 14, 1992, now U.S. Pat. No. 5,200,913, issued Apr. 6, 1993, which is a continuation of patent application Ser. No. 07/519,031, filed May 4, 1990, now abandoned.

BACKGROUND OF THE INVENTION

This invention relates to the field of personal computers and, more particularly, to the field of portable computers, sometimes termed "laptop" computers.

Truly portable computers are known which are relatively small, light in weight and convenient to carry and use in transit. Such computers are small enough to be comfortably placed on one's lap, hence the term "laptop" computer. Computers of this type are usually provided with a down-sized version of a standard personal computer keyboard, a display, a portable power supply (e.g., rechargeable batteries) and various interface connections for enabling the computer to be electrically coupled to other devices, such as input/output devices (disk drives, printers, and the like) and communication links (e.g., telephone lines). The display is typically pivotally mounted to the computer housing at a point intermediate the front and rear margins so as to be maneuverable between a closed position in which the viewing surface of the display covers the keyboard and acts as a shield, and an opened position in which the keyboard is exposed and the viewing surface of the display is arranged at a viewing angle. A representative portable computer having the above components and configuration is disclosed in U.S. Pat. No. 4,571,546 issued Feb. 18, 1986 for "Portable Computer", the disclosure of which is hereby incorporated by reference.

A relatively new type of portable computer introduced by the Assignee of this application is smaller and lighter than a typical laptop computer and features a display operable by a conductive pointed stylus which is employed by a user in much the same manner as a pen or pencil on a pad: hence the term "pad computer". This pad computer is meant to be employed like a pen and tablet in the field, and is devoid of any keyboard. The pad computer is, however, provided with a connector for enabling an auxiliary keyboard to be connected to the pad computer in order to add keyboard capability to the pad computer. However, the major mode of use envisioned in the pad computer encompasses the use of the stylus to permit hand entry of information into the computer via the display.

SUMMARY OF THE INVENTION

The invention comprises a portable computer which combines the standard keyboard capability of a laptop computer with the stylus data entry capability of a pad computer, but which is substantially the same size and weight as the pad computer.

The invention comprises a portable computer having a housing, a keyboard carried by the housing, and display means having a viewing surface and an opposing surface, the display means being coupled to the housing and moveable between a closed position in which the opposing surface of the display means covers the keyboard and an opened position in which the keyboard is uncovered and the display means is positioned rearwardly of the keyboard with the viewing surface arranged at a convenient viewing angle. In the closed position, the invention can be used as a pad computer by entering information via a stylus applied directly to the display, while in the open position the portable computer can be used as either a standard laptop computer using the exposed keyboard for information entry or as a combination laptop and pad computer. In order to facilitate use of the computer in the laptop mode when the display means is positioned with the keyboard exposed, a stylus receptacle is provided in a mask region adjacent the viewing region of the display means, so that the stylus can be removably held in the receptacle.

To facilitate storage and transit of the portable computer, a latching means is provided for removably securing the display means to the housing. The latching means is located approximately mid-way between a front portion and a rear portion of the computer housing. Preferably, the latching means comprises a pair of retractable latch members and corresponding slotted walls, with each latch member/slotted wall pair being located adjacent a different one of the opposing side margins of the computer housing. In the preferred embodiment, each latch member is retractably carried by the display means, and each slotted wall comprises a portion of the computer housing.

The display means is pivotally mounted to the computer housing by means of a four bar hinge mechanism which includes first and second forward hinge members and a rear hinge means. The forward hinge members pivotally couple the display means to the housing at hinge points positioned adjacent opposed housing side margins extending between the front and rear of the housing. Each of the first and second forward hinge members are preferably coupled to the associated side of the display means adjacent a forward corner thereof; and the first and second forward hinge members are also each coupled to the housing side margins at a pivot point conveniently located between the front portion of the housing and the rear edge of the keyboard. Each side margin of the housing is provided with a slotted wall for receiving the corresponding one of the hinge members. The opposing surface of the display means is hinged to the housing by means of the rear hinge means which is coupled at the top edge thereof to the opposing surface of the display means and which is also coupled at the bottom edge thereof to the housing at a position rearwardly of the keyboard.

The housing is further provided with a rear wall portion with a recess formed therein for removably accommodating a power pack having a shape conformable with the recess. The power pack includes a receptacle area for accommodating a battery power source, and also a battery charging circuit so that the batteries may be recharged with the power pack attached to the computer housing.

An auxiliary stylus mounting mechanism is provided along the rear top margin of the housing for removably attaching the stylus to the computer when the display means is in the closed position or the stylus is not needed.

The invention provides a light weight portable computer which is capable of functioning in either a laptop mode, a pad mode or a combination of the two. In addition, the mounting mechanism for the display conveniently enables the display to cover the keyboard when use of the keyboard is not required, and to quickly uncover the keyboard and arrange the display at a convenient viewing angle when the computer is to be used on a desk top or other support surface.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a perspective view showing the invention with the display covering the keyboard;

FIG. 2 is a perspective view of the preferred embodiment of the invention showing the display in the open position in which the keyboard is exposed;

FIG. 3 is a schematic side view illustrating the display articulation between the closed and open positions;

FIG. 4 is an enlarged view partially broken away illustrating the right front hinge;

FIG. 5 is a top plan view partially broken away illustrating the layout of some of the components internal to the computer housing;

FIG. 6 is a right side view partially in section showing some internal components of the embodiment of FIG. 1;

FIG. 7 is a sectional view taken along lines 7—7 of FIG. 2 illustrating one of the stylus receptacles in the mask adjacent the viewing surface of the display; and FIG. 8 is a sectional view taken along lines 8—8 of FIG. 1 showing the right latch engaged.

DESCRIPTION OF THE PREFERRED EMBODIMENT

Turning now the drawings, FIGS. 1 and 2 illustrate the preferred embodiment of the invention in the closed and open positions, respectively. As seen in these Figures, the invention includes a housing generally designated with reference numeral 10 having a front portion 11, a rear portion 12, and side margins 13, 14. A keyboard 15 is arranged in the forward portion of housing 10 and extends approximately mid-way toward the rear portion 12 of the housing 10.

A display generally designated with reference numeral 20 is pivotally mounted to the housing 10 in such a manner that the viewing surface 21 of the display 20 is exposed in both the closed position illustrated in FIG. 1 and the open position illustrated in FIG. 2. Display 20 uses an LCD display with a transparent conductive screen overlay of the type disclosed in commonly assigned co-pending U.S. patent application Ser. No. 07/365,147, filed Jun. 12, 1989 for "HAND HELD COMPUTER" the disclosure of which is hereby incorporated by reference. Generally, the display 21 is charged with a voltage gradient which alternates along the X and Y axes of the display as described in U.S. Pat. No. 4,371,746, the disclosure of which is hereby incorporated by reference. The display may be used either for conventional display purposes (i.e., for displaying information entered via keyboard 15, computational results and user prompts or other information), or as an interactive data entry display tablet or pad. In this latter mode of operation (termed the "pad" mode), a conductive stylus 30 is employed much like a pen or pencil by the user. When the tip of the stylus touches the conductive screen overlay of the display 20, the stylus transmits the magnitude of the voltage of the overlay at that point to an overlay controller within the computer by means of a conductive lead 31 which plugs into a jack 32 located in the rear of the housing. A representative stylus 30 is disclosed in commonly assigned U.S. Pat. No. 4,927,986 issued May 22, 1990 for "Conductive Stylus Storage for a Portable Computer" the disclosure of which is hereby incorporated by reference. As shown in FIG. 1, a pair of stylus clips 34, 35 are positioned to the rear of the top wall of housing 10 for removably affixing the stylus 30 to the housing for storage and carrying. In order to facilitate use of the stylus when the computer is in the open configuration illustrated in FIG. 2, additional provision is made for removably affixing the stylus to the display 20. In the preferred embodiment, stylus receptacles are formed into the mask border portion 23 of the display 20 at any convenient location thereof. As illustrated in FIG. 2, two such receptacles are formed: a first receptacle 25 located in the lower right hand corner and a second receptacle 26 located in the lower left hand corner. One suitable shape for the receptacle 26 is illustrated in FIG. 7.

The display 20 is pivotally mounted to the housing 10 by means of a pair of forward hinges 40 and a rear hinge plate 41 forming a four bar hinge mechanism. As best shown in FIG. 4, each hinge 40 is pivotally attached at one end to the forward portion of the display side wall to form a first pivot 43. The other end of the hinge 40 is pivotally attached to the housing 10 adjacent the side margin in a region conveniently located between the front and rear edge of the keyboard 15. In the preferred embodiment, this pivot 44 is approximately mid-way between the front and rear edge of the keyboard 15. The rear hinge plate 41 is attached to the rear surface 27 of the display 20 (see FIG. 3) and also to the housing 10 near the rear portion 12. The rear hinge plate is preferably fabricated from a relatively stiff material which can be readily fastened at pivot points to the rear surface of the display 20 and the housing 10 in a durable fashion. In addition, the rear hinge plate 41 must accommodate the flexible electrical conductors (not illustrated) needed to electrically couple the display 20 to the computer elements within the housing 10. This may accomplished by a dual wall construction for rear hinge plate 41, so that the conductors are contained within an essentially flat envelope; or the conductors may be adhered to one of the two surfaces of the rear hinge plate 41, as desired. Also, the rear hinge plate 41 may comprise a wire frame or other equivalent mechanism for providing the hinge connection between the display 20 and the housing 10 as illustrated.

With reference to FIG. 3, when the display 20 is in the closed position, the hinge 40 is arranged in the full line position illustrated, with the majority of the hinge 40 being located in a recess 45 formed in the rear surface 27 of the display 20 along the side margins thereof near the forward edge. As the display 20 is maneuvered toward the fully open position, the hinge 40 follows a motion path as illustrated in the sequential phantom and broken line views until the display achieves the tilted position illustrated in double phantom lines. In this position, the display viewing surface 21 is inclined at an angle convenient to the user, and the hinge 40 is positioned within a recess 47 (see FIG. 2) and formed in the top wall of housing 10 adjacent the side margins. During motion between the fully closed and fully open positions, the rear hinge plate 41 assists in providing lateral stability to the display 20 and also provides two axes of rotation parallel to the width of the display 20 and the housing 10. Thus, the display 20 may be readily moved between the fully closed and fully open positions by simple manipulation of the display along the side margins thereof.

To facilitate storage, transport and use of the computer in the pad mode, a pair of latch mechanisms generally designated with reference numeral 50 are provided at approximately the mid-point of the side margins of display 20. As best seen in FIG. 8, which illustrates the latch in the engaged position, a latching member 51 is rearwardly biased by means of spring 52 towards an engaged position in which the hook end 53 of the latch member 51 is engaged with the undersurface 55 of the top wall of housing 10 inside the rear edge of the hinge recess 47. In this position, the display 20 is securely latched so that the keyboard 15 remains covered by the opposing surface of display 20. To unlatch the display, the latch button 56 of each latch assembly 50 is manipulated toward the front portion 11 of the housing 10 until the hook end 53 clears the wall surface 55 so that the display may next be manipulated upwardly and rearwardly as described above. To close, the display 20 is merely manipulated to the closed position, with or without manually retracting the latch buttons.

With reference to FIGS. 5 and 6, in addition to supporting the keyboard 15, housing 10 also contains various hardware components of the computer. Thus, for example, a main logic board 71 positioned rearwardly of the keyboard 15 is contained within housing 10 and provides both mechanical support and electrical connection for various integrated circuits and connectors mounted on the board 71. As illustrated, main logic board 71 supports a connector 73 for a memory card 74 on the top surface thereof and an additional memory card on the bottom surface (not shown). In addition, main logic board 71 supports a main on/off switch 76 accessible from the underside of the housing 10, and a stand-by switch 78.

Also secured within the rear portion of housing 10 is a modem unit 81 having a pair of telephone type connector sockets 82, 83 which are accessible through suitably shaped apertures in the side wall of housing 10. In addition, a display backlight inverter circuit 84 is positioned within housing 10 adjacent the main logic board 71. A pair of stylus jacks 32 are mounted to the housing along the rear portion of the left and right margins 13, 14 and are used to electrically couple the conductive stylus 30 to the circuitry on the main logic board 71. An auxiliary keyboard jack 85, and a serial port connector 86 are mounted in the housing along the rear wall 12.

Housing 10 is provided with a power pack recess 90 along the rear wall as shown in FIG. 1 for accommodating a power pack 95. Power pack 95 has a closed receptacle area for removably carrying a plurality of internally located DC batteries (not shown) used to power the computer in the field. Power pack 95 is also provided with a conventional battery charging circuit 96 at the left end and internally thereof with a detachable power connector cord 97, so that the batteries can be charged while still in the receptacle. A pair of power contacts 98, 99 are arranged as shown to provide electrical connection between the batteries in power pack 95 and the power input terminals (not illustrated) in housing 10.

In order to provide adequate space for the hardware components, the bottom wall 17 of housing 10 curves outwardly starting at approximately the mid-point thereof (just rearwardly of the keyboard 15). This curved portion 18 also provides an inclined angle to the plane of the housing 10 when the computer is placed on a desk top or other flat working surface to more closely approximate the feel of a conventional laptop computer or desk top personal computer. This inclined angle also facilitates use of the computer in the pad mode.

The entire computer has overall dimensions of a width of 11.5 in., a housing depth of 8.85 in., and a maximum thickness measured at the rear of 1.40 in. The display has a depth of 8.15 in., a thickness of 0.45 in at the rear half and 0.62 in. at the front half. The thickness of the housing 10 in the front region (the region where the keyboard 15 is located) is 0.39 in. Total weight of the computer is approximately four lbs.

As will now be apparent, the invention can be used as either a pad computer in combination with the stylus 30, or as a laptop computer by using the keyboard 15, or as a combination of both. When used as a pad computer, the stylus 30 is plugged into either one of the two jacks 32, the display 20 is normally in the closed position illustrated in FIG. 1, and the computer is held like a pad by the user. When the invention is used as a laptop computer with keyboard entry only, the stylus can be placed in the clips 34, 35 formed in the rear of the top wall portion of the housing 10. When the invention is used in the combined pad and laptop mode, the stylus 30 can be temporarily placed in the receptacles 25 or 26 to free both hands of the user to manipulate the keyboard 15.

While the above provides a full and complete disclosure of the preferred embodiment of the invention, various modifications, alternate constructions and equivalents will occur to those skilled in the art. For example, other hinge combinations can be used than those illustrated in the preferred embodiment, and different dimensions may be employed for the various portions of the housing. In addition, other stylus compatible displays may be employed; and other types of stylus devices, such as a cordless stylus, may be used as desired. Further, the locations of the additional stylus receptacles 25, 26, as well as the shape thereof, may be different from those illustrated. Moreover, different means for removably attaching the stylus to a convenient location for the user may be selected, as desired for any given application. Also, the particular latch configuration shown may be changed, as desired, to comply with the specific requirements of a particular application. Therefore, the above descriptions and illustrations should not be construed as limiting the invention which is defined by the appended claims.

What is claimed is:

1. A portable computer comprising:
    a computer housing;
    a keyboard carried by said computer housing;
    a display device having an obverse viewing surface an a reverse surface; and
    mounting means for coupling said display device to said computer housing, said mounting means having a first portion pivotally connected to said computer housing and a second portion pivotally connected to said display device, said display device being adjustable between a closed position in which the display covers the keyboard with said reverse surface and an open position in which the keyboard is uncovered and the display device is positioned rearwardly of the keyboard at a viewing angle.

2. A portable computer comprising:

a computer housing having a front portion, a rear portion and a pair of side margins extending between said first portion and said rear portion;

a keyboard carried by said computer housing;

a display device having a viewing surface;

mounting means for coupling said display device to said computer housing, said mounting means having a first portion pivotally connected to said computer housing and a second portion pivotally connected to said display device, said display device being adjustable between a closed position in which the display device covers the keyboard and an open position in which the keyboard is uncovered and the display device is positioned rearwardly of the keyboard at a viewing angle; and means for latching said display means to said computer housing, said latching means being located adjacent one of said side margins and approximately mid-way between said front portion and said rear portion, said latching means including a retractable latch member and a slotted wall for retractably receiving said latch member.

3. A portable computer comprising:

a computer housing having a rear wall portion with a recessed formed therein;

a keyboard carried by said computer housing;

a display device having an obverse viewing surface and a reverse surface;

mounting means for coupling said display device to said computer housing, said mounting means having a first portion pivotally connected to said computer housing and a second portion pivotally connected to said display device, said display device being adjustable between a closed position in which the display device covers the keyboard with said reverse surface and an open position in which the keyboard is uncovered and the display device is positioned rearwardly of the keyboard at a viewing angle; and power pack means having a shape conformable with said recess in said computer housing rear wall portion for enabling removable attachment of a power source to said housing, said power pack means including a receptacle area for accommodating a battery power source.

4. A portable computer housing assembly comprising:

a computer housing having a top and a bottom;

a keyboard mounted to the top of the computer housing;

a display housing including a display housing top and a display housing bottom;

a pad computer display carried by the display housing; and a connection assembly having a first portion pivotally connected to said computer housing and a second portion pivotally connected to said display housing for movably mounting the display housing to the computer housing for adjustable movement of the display between a closed position, with the display housing bottom covering the keyboard, and an open position, with the display housing at an inclined orientation relative to the computer housing, the pad computer display facing generally directly away from the keyboard when the display housing is in the closed position and facing away from the keyboard at an angle when the display housing is in the open position so that the pad computer display is accessible by a user at both of said positions.

5. A portable computer housing assembly comprising:

a computer housing having a top and a bottom;

a keyboard mounted to the top of the computer housing;

a display housing including a display housing top and a display housing bottom;

a pad computer display mounted to the display housing; and hinge means having a first portion pivotally connected to said computer housing and a second portion pivotally connected to said display housing for mounting the display housing to the computer housing for adjustable movement between a closed position, with the display housing bottom covering the keyboard, and an open position, with the display housing at an inclined orientation relative to the computer housing, the pad computer display facing generally directly away from the keyboard when the display housing is in the closed position and facing away from the keyboard at an angle when the display housing is in the open position so that the pad computer display is accessible by the user at both said positions.

6. A portable computer comprising:

a computer keyboard housing assembly including a computer housing and an upwardly facing keyboard mounted to the computer housing;

a display housing assembly including a display housing having a top and a bottom, and a pad computer display mounted to the display housing; and hinge means having a first portion pivotally connected to said computer housing and a second portion pivotally connected to said display housing for mounting the display housing assembly to the computer keyboard housing assembly for adjustable movement between open and closed positions, said display housing assembly lying adjacent the computer keyboard housing assembly to cover the keyboard in the closed position, said display housing assembly positioned at an angle to the computer keyboard housing assembly to expose the keyboard in the open position, said pad computer display facing away from the keyboard, so to be accessible by a user, when the display housing is in both the closed position and in the open position, whereby said portable computer can be used as a pad computer when the display housing assembly is in either the open position or in the closed position and as a keyboard computer when the display housing assembly is in the open position.

7. A convertible notepad/laptop computer comprising:

a base having a top surface;

an alpha numeric keyboard disposed on a section of the top surface;

a stylus electrically coupled to said computer;

a display housing having an upper surface and a lower surface;

a display/overlay combination carried by said housing for displaying symbols generated by the computer and for detecting the position of said stylus over said display/overlay; and a hinge assembly for coupling said display housing to said base, said hinge assembly having a first portion pivotally connected to said base and a second portion pivotally connected to said display housing, said hinge assembly having a closed position wherein the lower surface of the display housing substantially covers the upper surface of the base to configure the convertible computer as a notepad computer and the hinge assembly having an open position wherein the display/overlay combination is oriented at an angle relative to the upper surface of the base and the keyboard is exposed to configure the convertible computer as a laptop computer, said hinge assembly providing movement for said display housing between said closed position and said open position.

* * * * *